US008251469B2

(12) United States Patent
Reed

(10) Patent No.: US 8,251,469 B2
(45) Date of Patent: Aug. 28, 2012

(54) LOW ENERGY SOLID INK JET IMAGING APPARATUS

(75) Inventor: William Henry Reed, Green Valley, AZ (US)

(73) Assignee: Lexmark International, Inc., Lexington, KY (US)

( * ) Notice: Subject to any disclaimer, the term of this patent is extended or adjusted under 35 U.S.C. 154(b) by 448 days.

(21) Appl. No.: 12/632,214

(22) Filed: Dec. 7, 2009

(65) Prior Publication Data

US 2011/0134172 A1 Jun. 9, 2011

(51) Int. Cl.

| | |
|---|---|
| ***B41J 2/195*** | (2006.01) |
| ***B41J 2/17*** | (2006.01) |
| ***B41J 2/175*** | (2006.01) |
| ***B41J 2/01*** | (2006.01) |
| ***G01D 11/00*** | (2006.01) |

(52) U.S. Cl. .................. 347/7; 347/84; 347/88; 347/99; 347/103

(58) Field of Classification Search ................ 347/7, 88, 347/99, 103

See application file for complete search history.

(56) References Cited

U.S. PATENT DOCUMENTS 6,905,201 B2 * 6/2005 Leighton ........................ 347/88

* cited by examiner

*Primary Examiner* — Uyen Chau N Le
*Assistant Examiner* — Kajli Prince

(57) ABSTRACT

A printhead provides selective heating to a supply of molten ink within an ink flow channel. The printhead is adapted to be in electrical communication with a controller and programmed to determine ink required by a print job. Based on the determined ink required by the print job, the controller accordingly provides selective heating to the printhead. The printhead includes an ink inlet, a nozzle in fluid communication with the ink inlet, and an ink flow channel having a length and extending between the ink inlet and the nozzle. A molten ink supply from a solid ink supply retaining device is received by the ink inlet and ejected from the nozzle on a print medium. A plurality of heating zones is also disposed along the length and adjacent to the ink flow channel to provide heating to the molten ink supply adjacent to each of the plurality of heating zones.

19 Claims, 8 Drawing Sheets

LOW ENERGY SOLID INK JET IMAGING APPARATUS

BACKGROUND

1. Field of the Invention

The present invention generally relates to ink jet printheads for solid ink jet imaging apparatus, and more particularly to ink jet printheads that consume less energy during ink jetting operation.

2. Description of the Related Art

Consumer ink jet printers typically use water-based inks with a low concentration of pigment or dye. When these water-based inks are jetted on a print medium, the water evaporates or gets absorbed by the print medium. However, with respect to a solid ink or phase change printer, solid blocks of colored material are melted and jetted in molten form. These molten inks have the consistency of crayons or candle wax and, when transferred on to the print medium, solidify to form a printed image. The solid ink printer produces vivid colors and crisp lines because the ink stands on the surface of the paper instead of penetrating as with water-based inks.

One such example of a solid ink printer 10 is shown in FIG. 1. During an imaging operation, blocks of solid ink 12 are disposed within an ink loader 14. The ink loader 14 has a retaining plate 16 that retains the blocks of solid ink 12. Further, ink loader 14 also has a heating plate 18 disposed therein to make contact with the blocks of solid ink 12 within the ink loader 14. The heating plate 18 melts and transforms the blocks of solid ink 12 into molten form 20. The molten ink 20 is then injected into the printhead assembly 22, which in turn gets jetted on to an imaging drum 24 present within the solid ink printer 10. Accordingly, the molten ink 20 gets transferred on to the print medium 26 to form an image. However, there are considerable drawbacks associated with such a prior art solid ink printer 10.

One such drawback is that a delay of 15 minutes or more may be required for the solid ink printer 10 to warm up sufficiently to melt the solid ink to be used in printing from a powered-off state. Another drawback is that the heating plate 26 requires a large amount of energy in melting blocks of solid ink 12, in heating the printhead assembly 18, and in maintaining the solid ink jet printer 10 in a ready mode.

As such, there is a need to provide solid ink jet printers that consume less energy and also reduce time required for start-up before printing.

SUMMARY OF THE INVENTION

Disclosed herein is a printhead adapted to be in electrical communication with a controller programmed to determine an amount of ink required by a print job and providing a controlled heating of a molten ink supply within the printhead of an imaging apparatus and ejecting the molten ink supply towards a print medium. The printhead includes an ink inlet, a nozzle in fluid communication with the ink inlet, an ink flow channel having a length and extending between the ink inlet and the nozzle to receive the molten ink supply from the ink inlet and to enable the molten ink supply towards the nozzle to eject the molten ink supply from the printhead, and a plurality of heating zones disposed along the length and adjacent to the ink flow channel to provide heating to the molten ink supply adjacent to each of the plurality of heating zones to provide a continuous flow of molten ink supply to the nozzle, a number of each of the plurality of heating zones capable of being selectively actuated in response to the determined ink required by the print job.

In some embodiments, the printhead includes a solid ink supply retaining device to retain the molten ink supply, the solid ink supply retaining device further includes a plurality of solid colored inks and a heating chamber to transform the plurality of solid colored inks into a plurality of molten colored inks.

In some embodiments, the solid ink supply retaining device is disposed adjacent to the printhead, the printhead is a wide array printhead fixedly disposed above the print medium.

In some embodiments, the printhead is a shuttling printhead that shuttles across the print medium with the solid ink supply retaining device being fixedly disposed adjacent to a home position of the shuttling printhead.

In another aspect, a solid ink jet printer capable of ejecting a molten ink towards a print medium is disclosed. The solid ink jet printer includes a solid ink supply retaining device disposed within the solid ink jet printer to retain a plurality of solid colored inks, the solid ink supply retaining device adapted to transform the plurality of solid colored inks into a plurality of molten colored inks, a printhead disposed within the solid ink jet printer and in fluid communication with the solid ink supply retaining device, the printhead including an ink inlet, a nozzle in fluid communication with the ink inlet, an ink flow channel having a length and extending between the ink inlet and the nozzle to receive a molten single colored ink, from the ink inlet and supply the molten single colored ink to the nozzle to eject the molten single colored ink from the printhead, and a plurality of selectively actuated heating zones disposed along the length of and adjacent to the ink flow channel to provide selective heating to the molten single colored ink adjacent thereto and to provide a constant flow of the molten single colored ink to the nozzle, and a controller programmed to determine ink required by a print job and disposed to be in electrical communication with each of the plurality of selectively actuated heating zones, the controller selectively actuating a number of heating zones from the plurality of selectively actuated heating zones based upon the determined ink.

In some embodiments, the solid ink supply retaining device further includes a heating chamber disposed therein and in contact with each of the plurality of solid colored inks to transform the plurality of solid colored inks into the plurality of molten colored inks.

In some embodiments, the controller is in electrical communication with the solid ink supply retaining device and selectively actuating the heating chamber to transform the plurality of solid colored inks into the plurality of molten colored inks.

In some embodiments, the solid ink supply includes an ink cassette and a heating chamber connected to the ink cassette, the ink cassette feeding the plurality of solid colored inks to the heating chamber.

Additional features and advantages of the invention will be set forth in the detailed description which follows, and in part will be readily apparent to those skilled in the art from, that description or recognized by practicing the invention as described herein, including the detailed description which follows, the claims, as well as the appended drawings.

It is to be understood that both the foregoing general description and the following detailed description of the present embodiments of the invention and are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein.

DETAILED DESCRIPTION OF THE INVENTION

Figure 1:
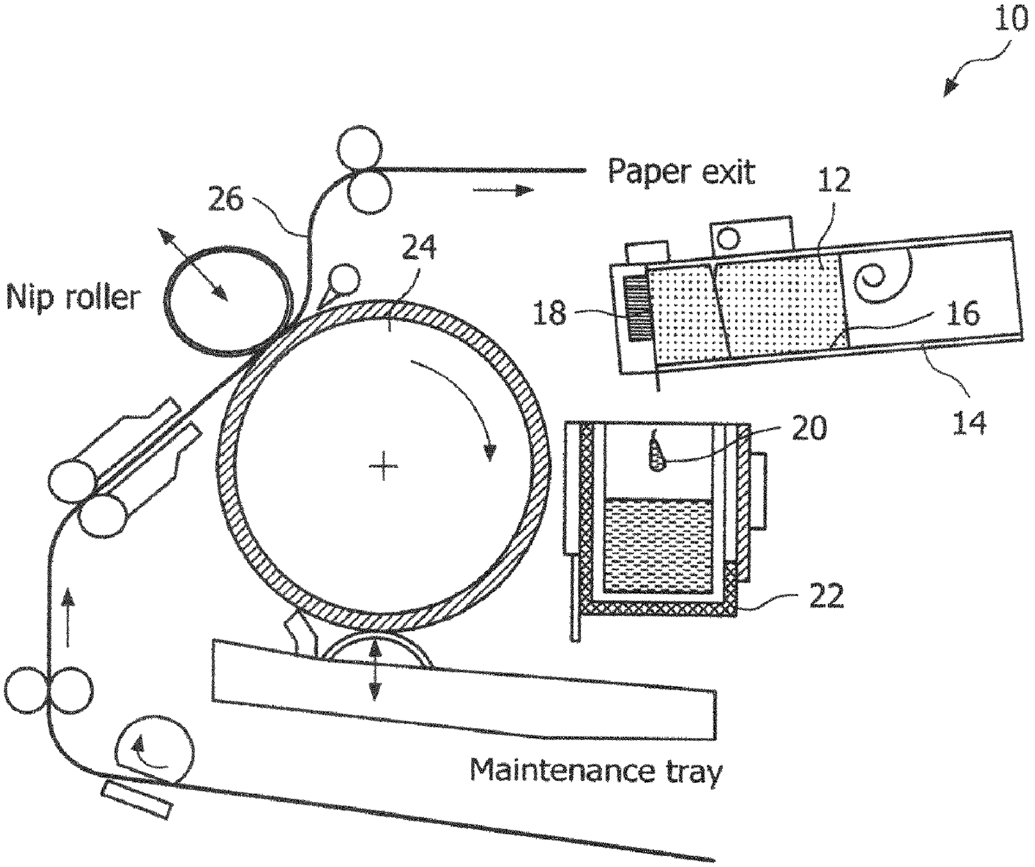
FIG. 1 (Prior Art)
FIG. 1 is an illustration of a prior art solid ink printer having an ink loader and a printhead.

Reference will now be made in detail to the exemplary embodiment(s) of the invention, as illustrated in the accompanying drawings. Whenever possible, the same reference numerals will be used throughout the drawings to refer to the same or like parts.

Figure 2:
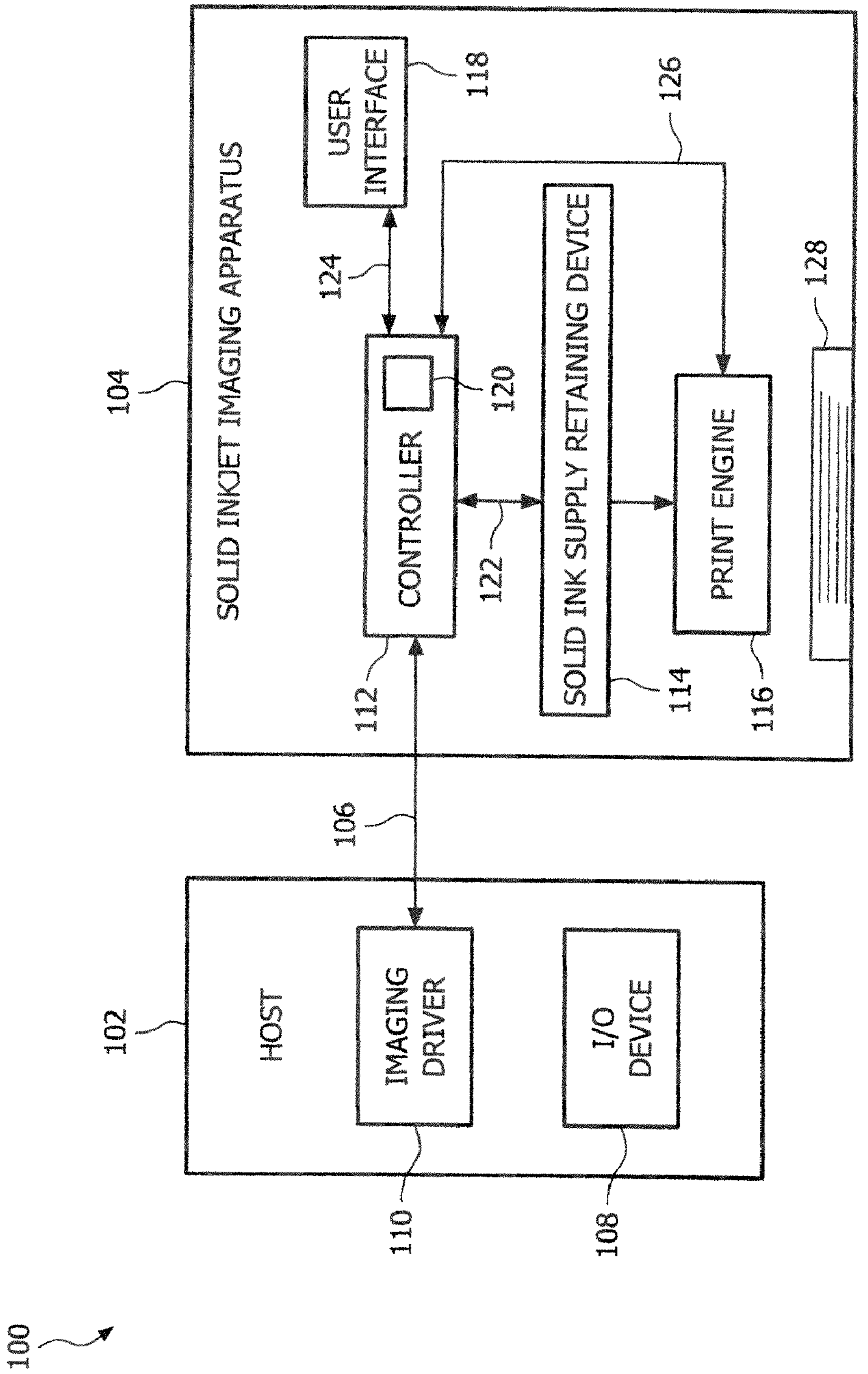
FIG. 2 is a diagrammatic representation of one embodiment of an imaging system according to the present invention.

Referring now to the drawings and particularly to FIG. 2 where imaging system 100 includes a host 102 and a solid ink jet imaging apparatus 104. Alternatively, the solid ink jet imaging apparatus 104 may also be a stand-alone apparatus without a host 102. The host 102 is communicatively coupled to the solid ink jet imaging apparatus 104 via a communication link 106. The communication link 106 may also be established by other means, for example, by a direct cable connection, by a wireless connection, or by a network connection for example, an Ethernet local area network (LAN).

In embodiments including the host 102, the host 102 may include, for example, a personal computer including an input/output (I/O) device 108, such as a keyboard and a display monitor. The host 102 also includes a processor, input/output (I/O) interfaces, memory (such as RAM, ROM, and NVRAM), and may include a mass data storage device, such as a hard drive, CD-ROM, and/or DVD units. The host 102 includes in its memory programmed instructions that function as an imaging driver 110, e.g., a printer driver that may be in the form of software. The imaging driver 110 facilitates communication between the host 102 and the solid ink jet imaging apparatus 104 and may provide formatted print data to the solid ink jet imaging apparatus 104. Alternatively, all or a portion of the imaging driver 110 may be incorporated into a controller 112 of the solid ink jet imaging apparatus 104. Likewise, all or a portion of the controller 112 may be incorporated into the host 102.

The solid ink jet imaging apparatus 104 includes the controller 112, a solid ink supply retaining device 114, a print engine 116 that has a printhead (not shown) disposed therein, and a user interface 118. The solid ink jet imaging apparatus 104 may be, for example, a printer or a multifunction unit. The solid ink jet imaging apparatus 104 with the print engine 116 may be able to perform standalone functions, such as copying and sending and receiving facsimiles. The solid ink jet imaging apparatus 104 may also be connected to the host 102 via the communications link to facilitate printing or any of the other functions.

The controller 112 includes a processor unit 120 that may be an Application Specific Integrated Circuit (ASIC). The controller 112 communicates with the solid ink supply retaining device 114 via a communication link 122. The controller 112 also communicates with the user interface 118 and the print engine 116 via the communication links 124 and 126, respectively. The communication links 122, 124, and 126 may be established by using cabling, a plurality of bus structures, by a wireless connection, or by any other appropriate method and be within the scope of the present invention.

The solid ink supply retaining device 114 has a supply of solid ink 136 and is controlled by the controller 112 as illustrated in FIG. 2. When a print job is executed by a user from the host 102, the controller 112 determines the total amount of ink that will be required to print the print job and directs the solid ink supply retaining device 114 to melt an appropriate amount of solid ink for that print job. Thus, only the needed amount of molten ink is conveyed from the solid ink supply retaining device 114 to the print engine 116. The controller 112 can determine from the data related to the print job the approximate amount of ink required based on the text required to be printed and the amount of ink coverage needed to print that text.

The molten ink from the solid ink supply retaining device 114 is then received by the print engine 116. The printhead present within the print engine 116 then selectively heats the molten ink under control of the controller 112. This controlled selective heating of the molten ink applies heat more precisely in specific locations within the printhead and heats only that amount of the molten ink needed to complete each print job. Thus, the entire printhead may not need to be heated and, accordingly, less energy is required by the printhead to heat the supply of molten ink and complete the print job. The heated molten ink is then jetted outwardly on a print medium 128, such as a sheet of paper, transparency or fabric to form an image in the form of text and/or graphics.

Figure 3:
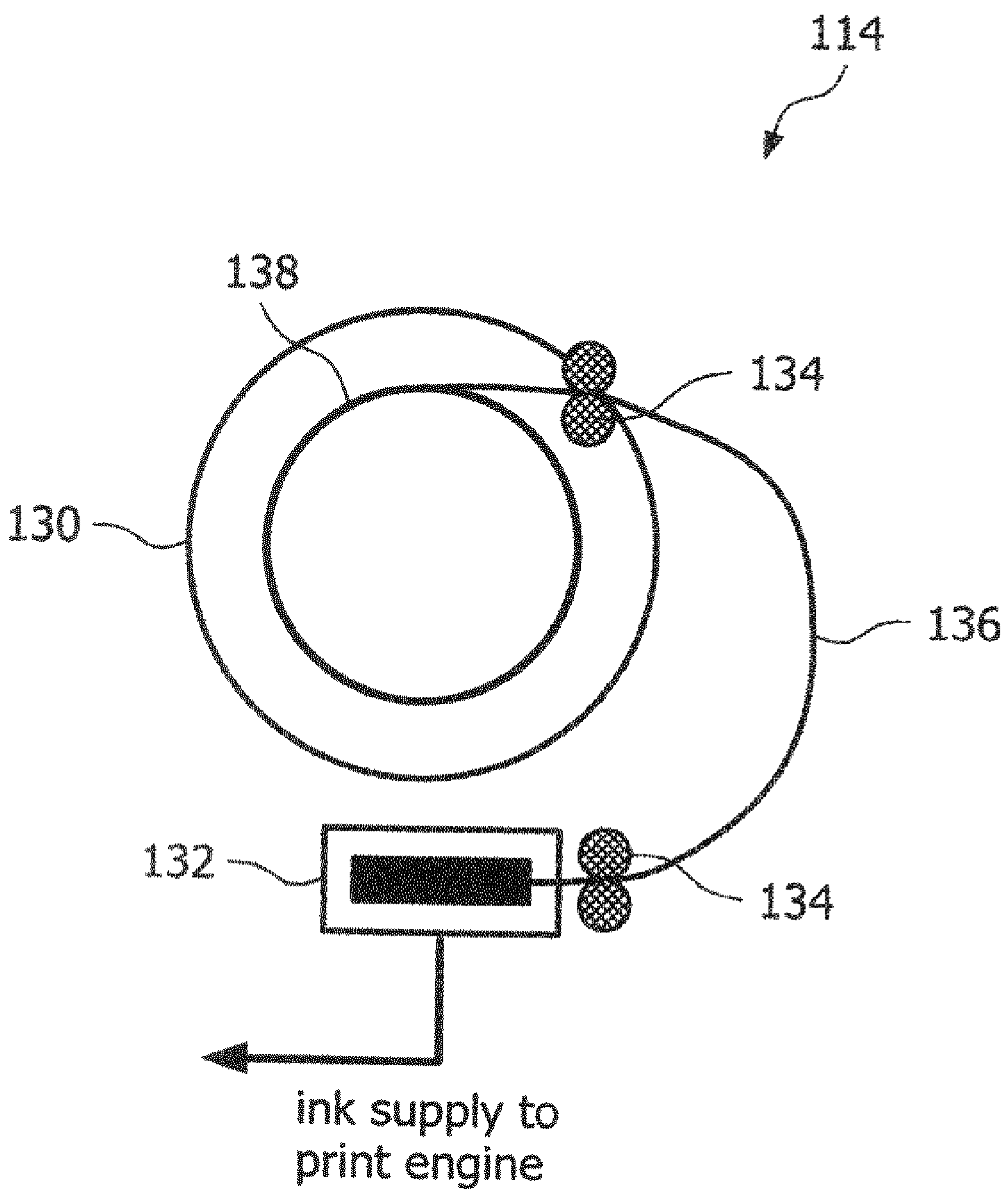
FIG. 3 shows one embodiment of a solid ink supply retaining device according to the present invention to be used with the imaging system of FIG. 2.

FIG. 3 illustrates a schematic view of one embodiment of a solid ink supply retaining device 114 according to the present invention. The solid ink supply retaining device 114 optionally includes an ink cassette 130, a heating chamber 132, and a transfer medium 134, illustrated as a plurality of feed rolls 134 in this embodiment. The ink cassette 130 retains a supply of solid ink 136, which is optionally in the form of a coil 138 of thin tape or narrow diameter wire, ribbons, or the like shapes. These shapes of solid ink 136 have a large surface to volume ratio so that small portions of ink can be rapidly melted using less energy than in other forms. Additionally, the material from which the solid ink is made is somewhat brittle and therefore the thickness of the coil 138 is smaller and the diameter of the coil 138 is larger, ensuring that the bending stresses are low enough and the supply of solid ink 136 is easily coiled.

Further, the supply of solid ink 136 in this form has a large contact area, allowing it to be melted more quickly since the ink is a poor thermal conductor. The shape of the tape also allows a leading edge of the coil 138 to be very easily pulled into the heating chamber 132 and efficiently melted to supply the print engine 116.

The ink cassette 130 may also contain a plurality of colored solid inks (not shown) in the form of coils that may be fed into the heating chamber 132. With multiple colors, the ink cassette 130 would include four colors of ink, e.g., black, yellow, cyan, and magenta. All of the four colored solid inks are optionally disposed side by side within the ink cassette 130, with each being connected to a respective rolling mechanism (such as rollers 134) to ensure smooth transport of the solid colored ink within the ink cassette. The separate rolling mechanisms for each of the four coils also prevents interference and mixing of the solid colored inks when one or more of solid colored inks move within the ink cassette 130.

As illustrated in FIG. 3, the supply of solid ink 136 is fed into the heating chamber 132 using the plurality of feed rolls 134. Optionally, a pair of feed rolls 134 is disposed within the ink cassette 130 to smoothly transport the supply of solid ink 136 out of the ink cassette 130 and another pair of feed rolls 134 is disposed at the entrance of the heating chamber 132. This configuration for the feed rolls 134 ensures an uninterrupted supply of solid ink 136 is present for the heating chamber 132. The heating chamber 132 uses known heating mechanisms for heating the supply of solid ink 136 in the heating chamber 132. Optionally, the heating chamber 132 incorporates a plurality of heating elements, such as actuators (as described in more detail below), to heat the supply of solid ink 136 within the heating chamber 132.

The solid ink supply retaining device 114 is disposed within the solid ink jet imaging apparatus 104 and operationally connected to the print engine so that the print engine 116 receives the supply of the molten ink. Further, flow of the molten ink from the solid ink supply retaining device 114 to the print engine 116 is under the influence of the gravitational forces. Alternatively, the solid ink jet imaging apparatus 104 may also be designed to pressure feed the molten ink, from the solid ink supply retaining device 114 to the print engine 116.

Figure 4:
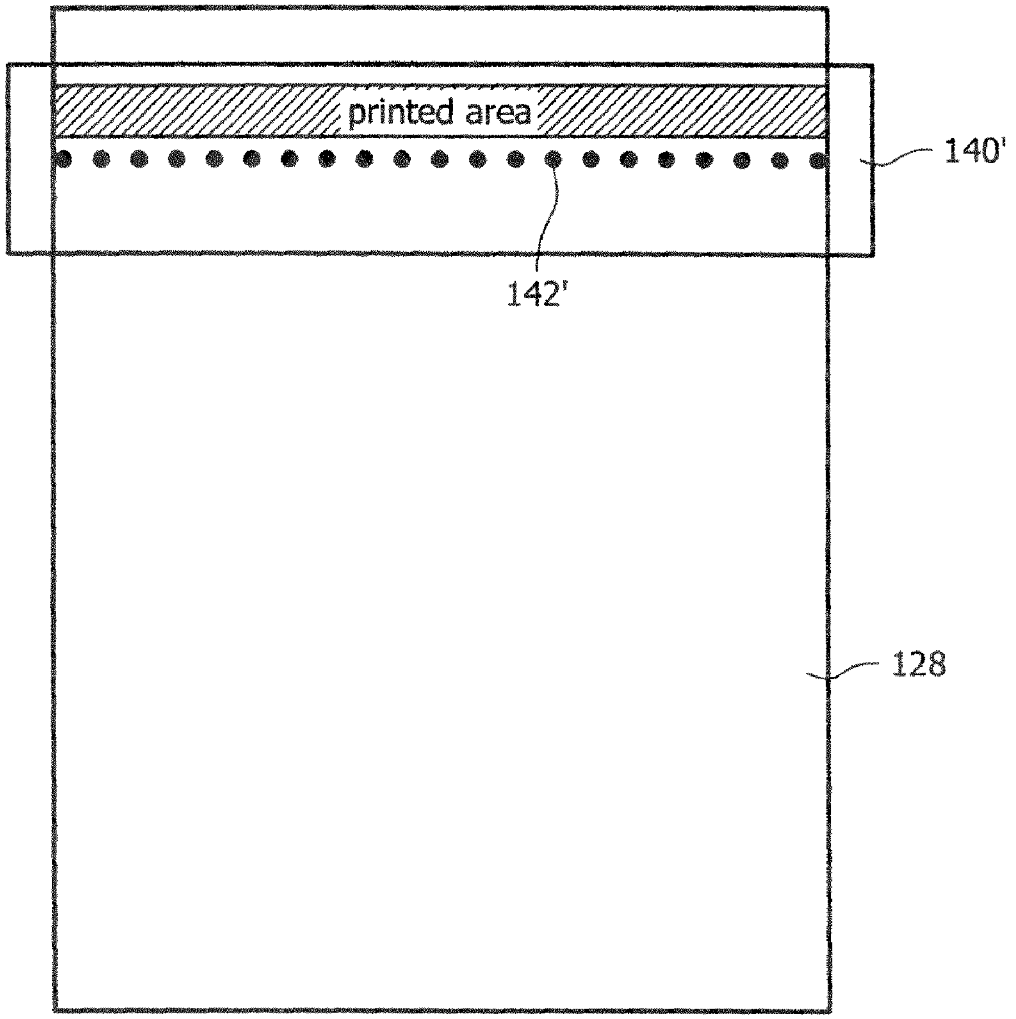
FIG. 4 is a diagrammatic representation of on embodiment of a print engine to be used with the imaging system in FIG. 2 disposed over a print medium.
Figure 5:
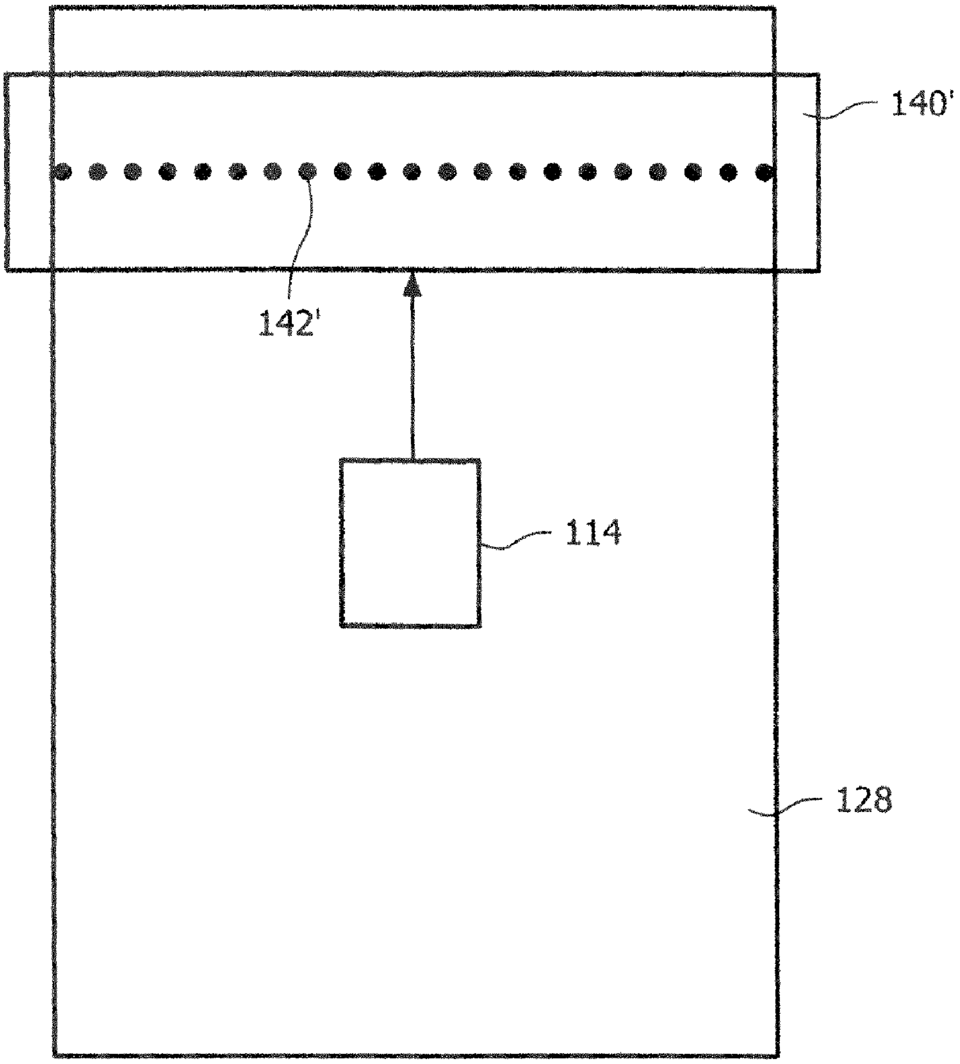
FIG. 5 shows a fluid interconnection between the print engine of FIG. 4 and the solid ink supply retaining device.

An exemplary embodiment of a printhead according to the present invention is shown in FIGS. 4 and 5. In this embodiment, a wide array printhead 140' is disposed over the print medium 128 with the print medium moving relative to the wide array printhead 140'. The wide array printhead 140' has a plurality of nozzles 142' arranged in such a manner over the print medium 128 that the plurality of nozzles 142' extends across the width of the print medium 128. As shown in FIG. 5, the solid ink supply retaining device 114 is disposed adjacent to the wide array printhead 140'. Optionally, the solid ink supply retaining device 114 is disposed on top of the print engine 116 and feeds a continuous supply of molten ink to the wide array printhead 140'. However, the solid ink supply retaining device 114 could also be disposed at any convenient place within the solid ink jet imaging apparatus 104 to supply a continuous feed of the molten ink.

Figure 6:
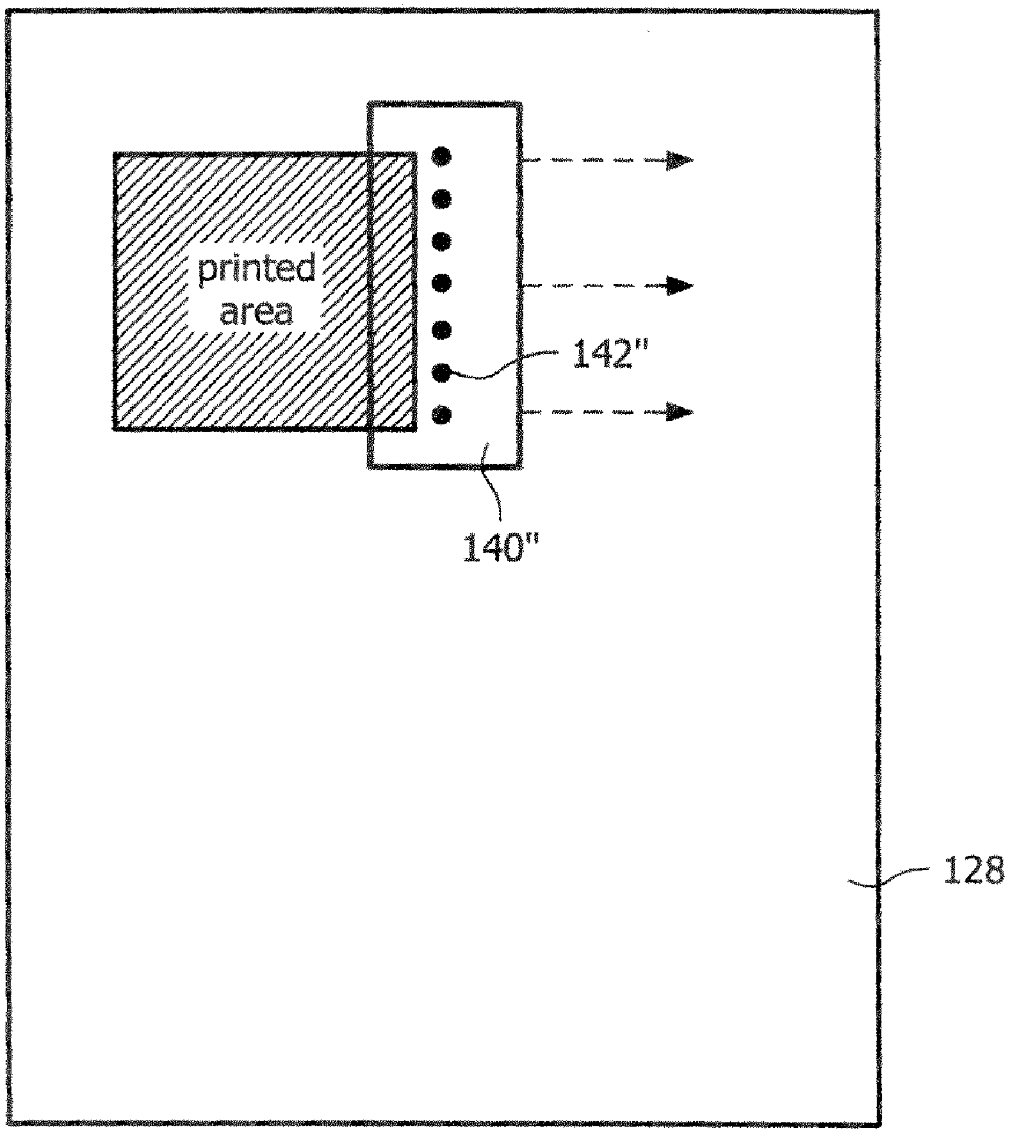
FIG. 6 is a diagrammatic representation of one embodiment of a shuttling print engine shuttling across the print medium.
Figure 7:
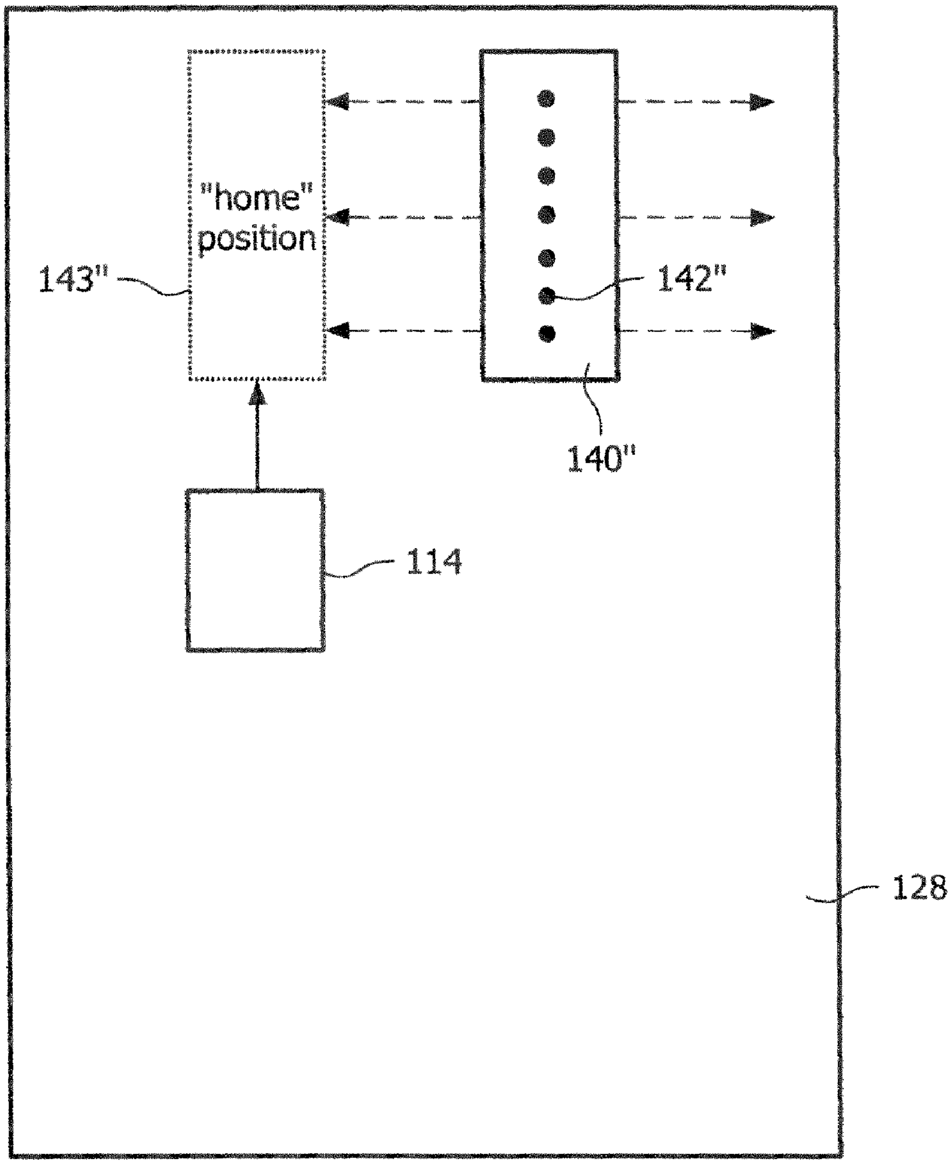
FIG. 7 shows the fluid interconnection between the shuttling print engine of FIG. 6 and the solid ink supply retaining device.

In another embodiment of a printhead according to the present invention as shown in FIGS. 6 and 7, a shuttling printhead 140" shuttles across the print medium 128. The solid ink supply retaining device 114 is optionally disposed on top of the shuttling printhead 140" feeding the supply of molten ink thereto. The solid ink supply retaining device 114 is optionally fixed at a home position 143" with the printhead 140" moving between the home position 143" and a distal position (not shown) on the print medium 128. In such an arrangement of the solid ink supply retaining device 114 and the shuttling printhead 140", the supply of molten ink from the solid ink supply retaining device 114 to the printhead 140" is available to the printhead 140" only when the printhead 140" is in the home position 143".

Figure 8:
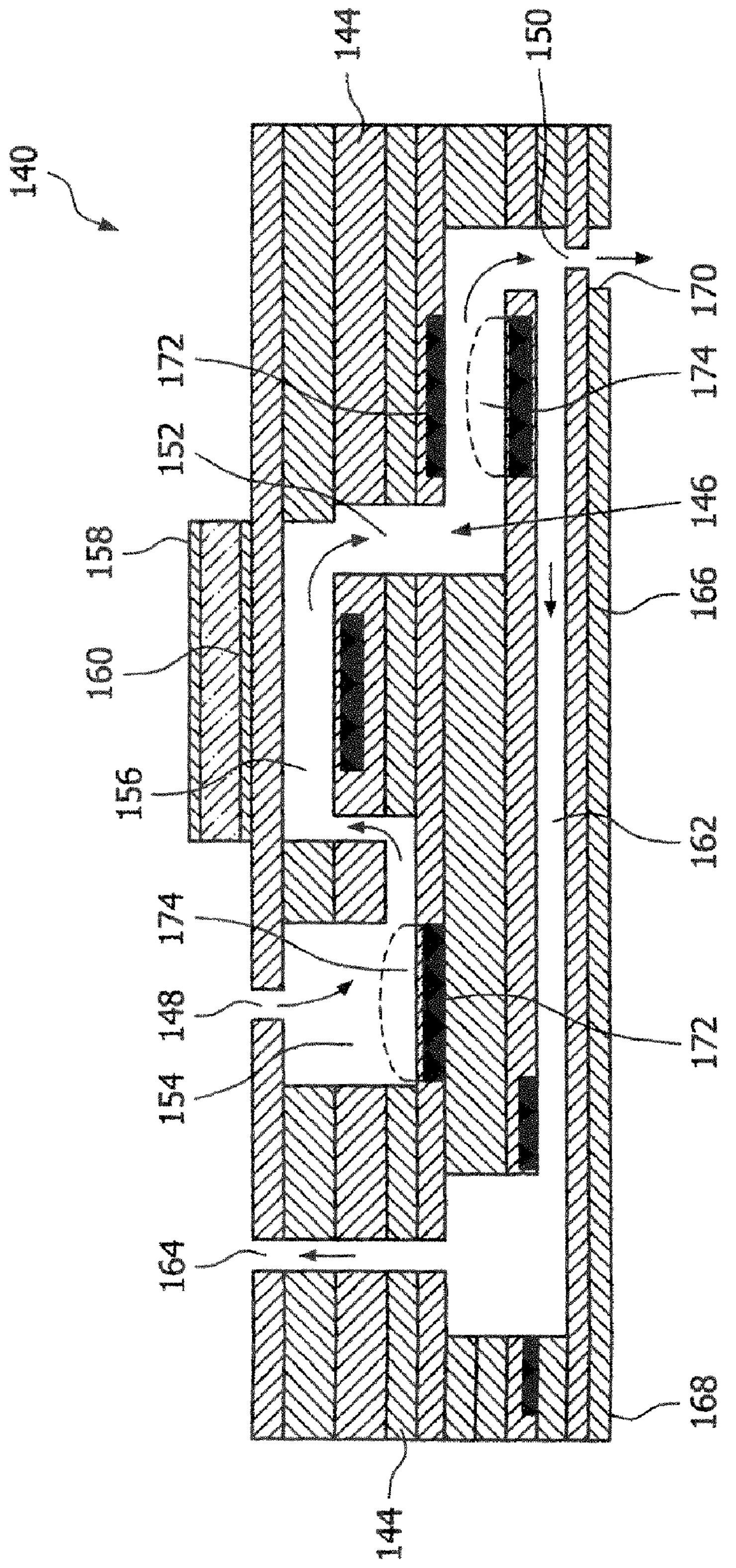
FIG. 8 shows a cross-sectional view of one embodiment of the printhead illustrated in FIG. 2 according to the present invention.

An exemplary embodiment of a printhead according to the present invention is illustrated in FIG. 8. The printhead 140 is representative of printheads 140',140" and the principles and operation applies to either or both printheads 140',140". The printhead 140 is optionally formed from a plurality of stainless steel sheets 144 etched with interconnection patterns and diffusion bonded together. The plurality of stainless steel sheets 144 of film are laminated together to form a distribution assembly 146. In another embodiment of the printhead 140 according to the present invention, the printhead 140 may be fabricated from a polyimide film with the distribution assembly 146 etched or laser ablated. As known to those in the art, other materials and methods of manufacture may be used and still come within the scope of the present invention.

The distribution assembly 146 includes an ink inlet 148, an ink outlet 150, and an ink flow channel 152 extending between the ink inlet 148 and the ink outlet 150. The distribution assembly 146 also includes an ink supply manifold 154 and an ink pressure chamber 156 disposed within the ink flow channel 152. The printhead 140 acts like a pump pulling the supply of molten ink from the solid ink supply retaining device 114 and providing the molten ink to the ink flow channel 152. After entering the printhead 140, the supply of the molten ink enters the ink supply manifold 154 and travels along the ink flow channel 152 to reach the ink pressure chamber 156.

The ink pressure chamber 156 has a diaphragm 158 that is optionally formed from a piezoceramic disc 160. Further, the piezoceramic disc 160 may also be electrically connected to a controller and optionally made flexible. Due to this flexibility, the piezoceramic disc 160 changes its dimensions to allow the piezoceramic disc 160 to bend. Optionally, the piezoceramic disc 160 operates in two bending modes. A voltage applied by the controller across the piezoceramic disc 160 allows the piezoceramic disc 160 to bend in a first direction to operate in a first bending mode. Under the first bending mode, the piezoceramic disc 160 pulls the supply of molten ink from the ink inlet 150 and allows molten ink to fill the vacant space within the ink pressure chamber 156. Thus, the supply of molten ink received by the ink inlet 148 is drawn towards the ink pressure chamber 156 within the ink flow channel 152.

Once the supply of the molten ink is received in the ink pressure chamber 156, the controller again applies a voltage to the piezoceramic disc 160. This applied voltage enables the piezoceramic disc 160 to bend in a direction opposite to the first direction to operate in the second bending mode. In the second bending mode, the piezoceramic disc 160 pushes the molten ink out of the ink pressure chamber 156 towards the ink outlet 150.

FIG. 8 also illustrates a purging channel 162 formed within the printhead 140. The purging channel 162 is disposed adjacent to the ink outlet 150 and extends between the ink outlet 150 and a purging outlet port 164. The purging outlet port 164 is disposed adjacent to the ink inlet 148. During a purging operation, any ink separated from the supply of the molten ink flows through the purging channel 162 towards the purging outlet port 164. Thus, the purging channel 162 allows for priming of the printhead 140, removing any surplus pressure, and removing of impure ink contents (paper dust that enters the ink outlet 150, oxidized ink, etc.) during the printing operation.

The printhead 140 has a nozzle plate 166 that is attached to a bottom side 168 thereof. The nozzle plate 166 has a plurality of nozzles 170 formed therein in a pattern that corresponds to a pattern of ink outlets 150 in the printhead 140.

The printhead 140 has a plurality of heating actuators 172 embedded within the body of the printhead 140 and adjacent to the ink flow channel 152 and the purging channel 162 as illustrated in FIG. 8. Each of the plurality of heating actuators 172 is embedded at specific positions within the printhead 140 along the entire length of the ink flow channel 152, as well as in the purging channel 162. Each of the plurality of heating actuators 172 also has electrical circuits associated therewith as is known in the art.

The heating actuators 172 and the electrical circuits are attached to the printhead 140 by electronic assembly methods, for example, plating, thick film screening, bonding, and vapor deposition. Such electronic methods may allow the heating actuators 172 and the electrical circuits to add additional height to a surface of the ink flow channel 152. This additional height may weaken the attachment of the actuators 172 and the electrical circuits when they come in contact with supply of the molten ink during printing operations. So, to avoid the applied circuits and the heating actuators 172 from weakening, some portions of the ink flow channel 152 and the purging channel 162 are provided with grooves or recesses to receive the actuators 172 and electrical circuits.

Each of the plurality of heating actuators 172 is in electrically connected to the controller 112, allowing individual control of each of the plurality of heating actuators 172. As shown in FIG. 8, a heating zone 174 corresponding to each of the plurality of the heating actuators 172 are formed within the ink flow channel 152 and the purging channel 162. Accordingly, the molten ink present within the printhead 140 is heated up as it enters these heating zones 174 within the ink flow channel 152.

Based on the supply of the molten ink received by the printhead 140, the controller 112 selectively actuates each of the heating actuators 172 to produce the desired heat within their respective heating zones 174. If the print job is small and a small amount ink is required for printing operation, then the controller 112 allows the only a small amount of ink to be melted from the solid ink supply retaining device 114 and actuates only some of the heating actuators 172 required for that amount of molten ink. Only one or two of the heating actuators 172 near the ink inlet 150 may be actuated with the rest of the plurality of the heating actuators 172 left in a non-actuating condition. However, if the print job is larger and a greater amount of ink is required, then all of the heating actuators 172 may be selectively actuated. In this situation, actuation of the heating actuators 172 is done in a sequential manner starting with the heating actuator 172 present near the ink inlet 148 towards the heating actuator 172 present adjacent to the ink outlet. Such sequential actuation of the heating actuators 172 ensures formation of a wave of heat that assists in feeding the ink in a forward direction towards the ink outlet 150.

Moreover, this selective actuation of the heating actuators 172 develops the necessary jetting pressure within the molten ink to jet the molten ink on to the print medium through the nozzle 170. Additionally, the heat also maintains the molten ink in a fluid form. Optionally, the supply of molten ink is heated to about a temperature of 135° C., the melting temperature of the solid ink.

In another embodiment of a printhead according to the present invention, a plurality of distribution assemblies 146 is optionally formed within the printhead. Each of the distribution assemblies 146 is constructed the same as printhead 140, but there are multiple distribution assemblies each separately controlled by a controller as described above.

There are optionally four ink supply manifolds within the printhead, each of which receives a supply of molten ink of a single color from the solid ink supply retaining device 114. The four ink manifolds receive the supply of molten ink of four colors such as black, yellow, cyan, and magenta, respectively. The molten ink of each color optionally travels through the ink manifold towards the ink pressure chamber and further towards the ink inlet to be jetted outside the printhead.

However, precise amounts of energy may be digitally dispensed to control the distribution and jetting of the supply of the molten ink. Controller 112 actuates only those heating actuators where ink flow channels are needed for a particular print job. For example, no color ink will be required for a monochrome text print job and therefore the ink flow channels having the colored ink supply of the molten ink are not heated by the heating actuators 172.

Thus, the selective actuation of the supply of the molten ink prevents the entire printhead from being heated to the melting point of the solid ink 136. As such, less energy is required by the printhead. Moreover, with the supply of the molten ink heated just-in-time for each of the print job, the entire solid ink jet imaging apparatus 104 is allowed to cool between the print jobs and still attain acceptable response times when the solid ink jet imaging apparatus is needed.

The controller 112 may also be configured to receive thermal feedback signals from the electric circuitry of the plurality of heating actuators 172. This feedback allows the printhead to be modified dynamically to compensate for generalized heating of the printhead by controller 112.

It will be apparent to those skilled in the art that various modifications and variations can be made to the present invention without departing from the spirit and scope of the invention. Thus it is intended that the present invention covers the modifications and variations of this invention provided they come within the scope of the appended claims and their equivalents.

What is claimed is:

1. A printhead adapted to be in electrical communication with a controller programmed to determine an amount of ink required by a print job and providing a controlled heating of a molten ink supply within the printhead of an imaging apparatus and ejecting the molten ink supply towards a print medium comprising:

an ink inlet;

a nozzle in fluid communication with the ink inlet;

an ink flow channel having a length and extending between the ink inlet and the nozzle to receive the molten ink supply from the ink inlet and to enable the molten ink supply towards the nozzle to eject the molten ink supply from the printhead; and a plurality of heating zones disposed along the length and adjacent to the ink flow channel to provide heating to the molten ink supply adjacent to each of the plurality of heating zones to provide a continuous flow of molten ink supply to the nozzle, a number of each of the plurality of heating zones capable of being selectively actuated in response to the determined amount of ink required by the print job.

2. The printhead according to claim 1, further including a solid ink supply retaining device to retain the molten ink supply, wherein the solid ink supply retaining device further includes a plurality of solid colored inks and a heating chamber to transform the plurality of solid colored inks into a plurality of molten colored inks.

3. The printhead according to claim 2, wherein the solid ink supply retaining device is disposed adjacent to the printhead, and wherein the printhead is a wide array printhead fixedly disposed above the print medium.

4. The printhead according to claim 2, wherein the printhead is a shuttling printhead shuttling across the print medium with the solid ink supply retaining device being fixedly disposed adjacent to a home position of the shuttling printhead.

5. The printhead according to claim 1, wherein the ink flow channel includes a pressure chamber disposed within the ink flow channel to pull the molten ink supply from the ink inlet and to supply the molten ink supply towards the nozzle.

6. The printhead according to claim 1, further including a purging channel having a length and extending between the nozzle and an opening adjacent to the ink inlet, the purging channel having the plurality of heating zones disposed along the length of and adjacent to the purging channel, each of the plurality of heating zones selectively actuated to purge out an impure ink from the opening.

7. The printhead according to claim 1, wherein a heating actuator is disposed within each of the plurality of heating zones.

8. The printhead according to claim 1, wherein the printhead is fabricated from a polyimide film.

9. A solid ink jet printer capable of ejecting a molten ink towards a print medium comprising:

a solid ink supply retaining device disposed within the solid ink jet printer to retain a plurality of solid colored inks, the solid ink supply retaining device adapted to transform the plurality of solid colored inks into a plurality of molten colored inks;

a printhead disposed within the solid ink jet printer and in fluid communication with the solid ink supply retaining device, the printhead including:

an ink inlet;

a nozzle in fluid communication with the ink inlet;

an ink flow channel having a length and extending between the ink inlet and the nozzle to receive a molten single colored ink from the ink inlet and supply the molten single colored ink to the nozzle to eject the molten single colored ink from the printhead; and a plurality of selectively actuated heating zones disposed along the length of and adjacent to the ink flow channel to provide selective heating to the molten single colored ink adjacent thereto and to provide a constant flow of the molten single colored ink to the nozzle; and a controller programmed to determine an amount of ink required by a print job and disposed to be in electrical communication with each of the plurality of selectively actuated heating zones, the controller selectively actuating a number of heating zones from the plurality of selectively actuated heating zones based upon the determined amount of ink.

10. The solid ink jet printer according to claim 9, wherein the solid ink supply retaining device further includes a heating chamber disposed therein and in contact with each of the plurality of solid colored inks to transform the plurality of solid colored inks into the plurality of molten colored inks.

11. The solid ink jet printer according to claim 10, further comprising the controller in electrical communication with the solid ink supply retaining device and selectively actuating the heating chamber to transform the plurality of solid colored inks into the plurality of molten colored inks.

12. The solid ink jet printer according to claim 11, wherein the transformed molten ink is in proportion to the determined ink required by the print job.

13. The solid ink jet printer according to claim 9, the solid ink supply retaining device further comprising an ink cassette and a heating chamber connected to the ink cassette, the ink cassette feeding the plurality of solid colored inks to the heating chamber.

14. The solid ink jet printer according to claim 13, wherein the plurality of solid colored inks are disposed within the ink cassette in the form of ink ribbons that are fed into the heating chamber via feed rolls.

15. The solid ink jet printer according to claim 9, wherein the ink flow channel include a pressure chamber disposed within the ink flow channel to pull the plurality of solid colored inks from the ink inlet and to supply the plurality of molten colored inks to the nozzle.

16. The solid ink jet printer according to claim 9, further including a purging channel having a length and extending between the nozzle and an opening adjacent to the ink inlet, the purging channel having the plurality of heating zones disposed along the length of and adjacent to the purging channel, each of the plurality of heating zones selectively actuated to purge out an impure ink from the opening.

17. The solid ink jet printer according to claim 9, wherein the solid ink supply retaining device is disposed adjacent to the printhead, and wherein the printhead is a wide array printhead fixedly disposed above the print medium.

18. The solid ink jet printer according to claim 9, wherein the printhead is a shuttling printhead shuttling across the print medium with the solid ink supply retaining device being fixedly disposed adjacent to a home position of the shuttling printhead.

19. The solid ink jet printer according to claim 9, wherein a heating actuator is disposed within each of the plurality of heating zones.

* * * * *